US012744764B1

(12) United States Patent
Cheung et al.

(10) Patent No.: US 12,744,764 B1
(45) Date of Patent: Sep. 22, 2026

(54) SECURE AI OPERATIONS

(71) Applicant: 01 Quantum Inc., Toronto (CA)

(72) Inventors: Andrew Cheung, Toronto (CA); Alexey Shpurov, Toronto (CA)

(73) Assignee: 01 Quantum Inc., Toronto (CA)

( * ) Notice: Subject to any disclaimer, the term of this patent is extended or adjusted under 35 U.S.C. 154(b) by 0 days.

(21) Appl. No.: 19/341,748

(22) Filed: Sep. 26, 2025

Related U.S. Application Data

(60) Provisional application No. 63/774,297, filed on Mar. 19, 2025.

(51) Int. Cl.
*H04L 29/06* (2006.01)
*H04L 9/40* (2022.01)

(52) U.S. Cl.
CPC ........ *H04L 63/0442* (2013.01); *H04L 63/061* (2013.01)

(58) Field of Classification Search
CPC ............. H04L 63/0442; H04L 63/061; H04W 12/0471
See application file for complete search history.

(56) References Cited

U.S. PATENT DOCUMENTS

| | | | | |
|---|---|---|---|---|
| 11,961,068 B2 * | 4/2024 | Kilroe | ..................... | G06Q 40/04 |
| 2024/0403702 A1 * | 12/2024 | Deljavan Farshi | .... | G06N 20/00 |
| 2025/0150256 A1 * | 5/2025 | Park | ....................... | G06N 3/092 |
| 2025/0266983 A1 * | 8/2025 | Najarian | ................ | G06N 20/20 |
| 2025/0280305 A1 * | 9/2025 | Yip | ....................... | G06N 3/063 |

* cited by examiner

*Primary Examiner* — Amir Mehrmanesh
*Assistant Examiner* — Chi D Nguy
(74) *Attorney, Agent, or Firm* — IceMiller LLP

(57) ABSTRACT

An artificial intelligence model marketplace system secures both models and user data by managing computation-preserving-cryptography (CPC) encryption of data and models with public and private CPC user key pairs. Models can be encrypted by the marketplace system, model vendors, or third parties. e.g., in response to user requests to apply a model to their data to obtain a model prediction. Similarly, execution of the CPC encrypted models on CPC encrypted user data can be performed by the marketplace system, model vendors, or third parties. Selection of third parties for encryption and/or model execution work can be organized via staking mechanisms to create a secure, distributed, competitive marketplace for computational services.

8 Claims, 6 Drawing Sheets

SECURE AI OPERATIONS

CROSS-REFERENCE TO RELATED APPLICATIONS

This application claims benefit of priority from U.S. Provisional Patent Application No. 63/774,297, titled "Secure AI Operations," filed Mar. 19, 2025, the disclosure of which is hereby incorporated by reference in its entirety.

TECHNICAL FIELD OF THE INVENTION

This pertains to securing the privacy of Artificial Intelligence (AI) model operations, including securing the AI models and the data being fed into the AI models.

BACKGROUND

Artificial Intelligence (AI) and Machine Learning (ML) have been advancing for many decades. Until recently, the field largely remained experimental and theoretical. Today, advancements in computer hardware in terms of processing power, memory size, storage size, etc., have made the use of advanced AI and ML practical. In the last ten years, ML has become a critical aspect of many forms of AI such that in many cases the terms ML and AI have become synonymous.

AI applications are widespread, reaching into most aspects of everyday life. These applications range from chatbots, predictive text, customer behavior prediction, language translation to more sensitive fields such as facial recognition, fraud detection, anomaly detection, and autonomous vehicles, for example.

One of the most intriguing forms of AI is large language models such as ChatGPT, whereby a large amount of data such as text from the Internet is fed into the model, allowing it to find reasonable answers to just about any question it is asked.

SUMMARY

The security of AI operations can be enhanced by encrypting the AI model as well as the data that are feeding into it for a prediction in an end-to-end fashion using a form of special computation-preserving-cryptography (CPC) that allows mathematical calculation on the encrypted data without having to first decrypt them. As of the date of this disclosure, CPC encryption algorithms are available. One example of which is Full Homomorphic Encryption (FHE).

FHE is a type of CPC following the concept of PKI asymmetric cryptographic method whereby there is a keypair comprising of the private key and the public key. Fundamentally, both the AI model and the data being fed into it will be encrypted using the public key. Thereafter, the encrypted data will be fed into the encrypted AI model for a prediction result as if they are unencrypted. Basically, the CPC encrypted data works as if they are unencrypted within the CPC encrypted AI model as long as they are encrypted by the same public key. From the same token, the prediction results will also be encrypted whereby only the private key associated with the public key used in the CPC encryption can be used to decrypt back into plain text.

This way, users of the AI model will not have concerns about their confidential, highly sensitive data being leaked while the AI model vendors also do not have to worry about their AI model being reverse engineered by the users risking a pirated one being created. This is especially ideal for AI usage in industries with highly sensitive data such as facial recognition, fraud detection, anomaly detection, national security, etc.

Ultimate security can be achieved when all the communication sessions in this privacy-preserving AI operation are using Post-Quantum Cryptography (PQC) to ensure quantum-safety in the post-quantum world of computing.

DETAILED DESCRIPTION

Figure 1:
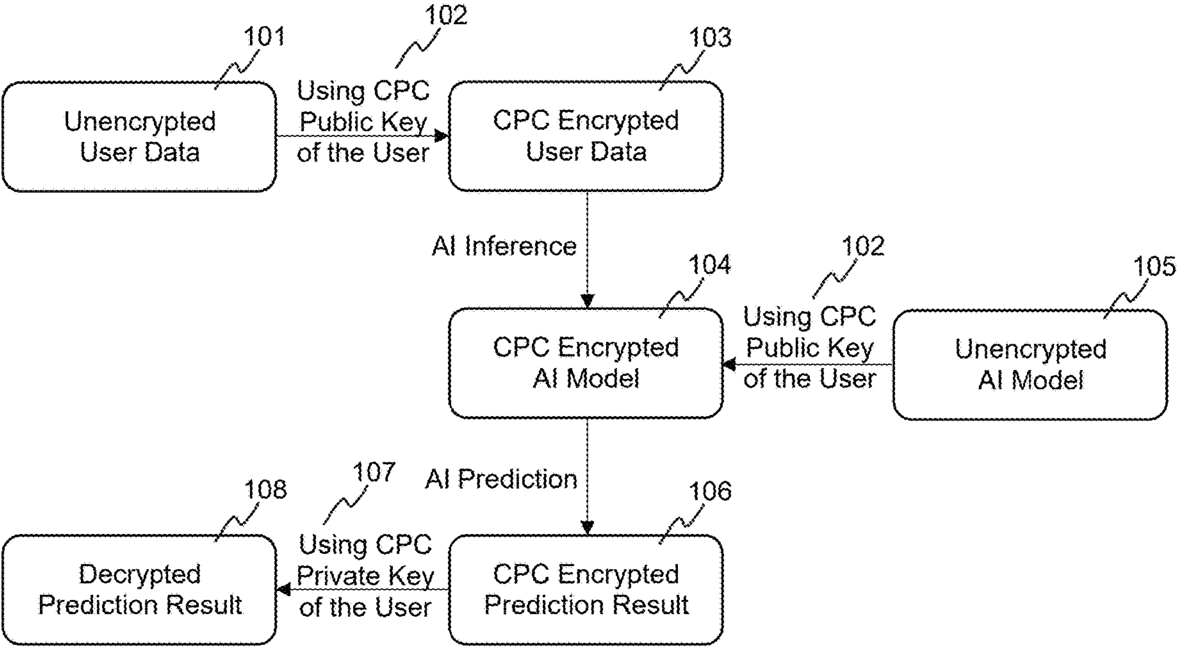
FIG. 1 is a block diagram illustrating the use of CPC in a general AI operation whereby both the AI model and the data being fed into it are both encrypted using the same public key and the final prediction result can be decrypted using the private key.

This disclosure relates generally to providing AI operations in a manner with total privacy protection whereby both the AI models as well as the users with sensitive data to be fed into the AI models. In addition, it also provides security with resistance to quantum computing attacks. The techniques described herein may be used, for example, to enhance the security of existing AI systems so that the AI operations will preserve total privacy as well as being safe from attacks by malicious users using quantum computers. In addition, this disclosure is a scalable method for AI operations by employing computation-preserving-cryptographic (CPC) technologies in conjunction with Post-Quantum Cryptography (PQC) technologies. At the time of this disclosure, CPC technologies and PQC technologies are well-known such as, but not limited to, Full-Homomorphic-Encryption (FHE) and Crystal-Kyber (NIST FIPS-203) respectively. NIST is the short form of the National Institute of Standards and Technology in the US which is part of the US Department of Commerce with the mission to promote U.S. innovation and industrial competitiveness by advancing measurement science, standards, and technology in ways that enhance economic security and improve our quality of life.

Different AI applications raise different security and privacy concerns. Some will argue that privacy is not a major concern for platforms such as open knowledge systems like ChatGPT. However, the story is very different for special purpose AI models tailored for specific industries with highly sensitive user data such as, but not limited to, national security, facial recognition, fraud detection, anomaly detection, etc. In both cases, both model creators and users can benefit from better security and privacy.

Consider the case of credit card fraud detection as an example. Imagine there is a reliable AI model specialized in credit card fraud detection whereby it will return a “fraud” or “valid” answer to any credit card transaction being fed into it. Each credit card transaction contains highly confidential customer information such as card number, expiration date, billing address, amount, merchant, etc. Feeding that information into a third-party credit card fraud detection AI model will constitute a significant violation of privacy requirements.

Similarly, the AI model creator may not want to sell the model outright to a credit card company because the creator has made significant efforts to create a reliable core model and wish to continue to develop the model. The creator may prefer a service model for monetizing the investment in the AI model creation.

These problems apply to all types of AI model, regardless of the method they used to train the model such as, but not limited to, linear regression, neural network, decision tree, deep learning, supervised learning, unsupervised learning, reinforcement learning, etc. The reason is that AI model and prediction operations are largely mathematical calculation. If the model or the data being fed into it become encrypted, the calculation will not work anymore. For example, computing the encrypted cipher of “1” and the encrypted cipher of “2” will not equate to the correct answer of “3”. This is one of the main reasons why AI models today are operating in an unencrypted fashion.

To apply the usage of CPC encryption, an AI model user is required to create a CPC keypair consists of a private key and a public key. The private key is secret and only known/kept by the AI model user while the public key is to be distributed to the public for others to encrypt something that ONLY the AI model user who possesses the private key can decrypt. Although not standardized by NIST as of the date of this disclosure, CPC keypair is considered to be safe against attack from quantum computers whereby the private key cannot be reverse engineered back from the public key by malicious users even using a powerful quantum computer. The sensitive data to be fed into the AI model will be encrypted using the public key of the AI model user. In a similar fashion, the AI model will also be encrypted using the same public key of the AI model user. It is not important at this point of context about who is performing the encryption for the AI model user and the AI model itself because it is the commercial application business model to determine who performs the encryption.

In the classical world of computing, it is virtually impossible to forge the private key. The word “virtually” is used because in cryptography there is no such thing as being absolutely uncrackable. The strength of a cryptography pertains to, in practical terms, how long it will take to find a solution by “brute force,” meaning to try all possible combinations. Today, it will take over 150 years for a traditional supercomputer to “brute force” reverse engineer the private key from the public key of the RSA/ECC algorithms which are commonly used in today’s cybersecurity. Therefore, the use of private keys and public keys is currently considered to be safe because the “brute force” time required is longer than the average lifespan of a human.

However, as theoretically proven, quantum computers have the ability to disrupt this scenario. Quantum computing is a mechanism originally proposed by scientists such as Paul Benioff and Richard Feynman in the early 1980s. It is based on quantum-mechanical phenomena such as superposition and entanglement so that computational steps can be carried out simultaneously, rather than sequentially as done on traditional digital computers. Over the years, several algorithms have been accepted as being capable of cracking the private and public key relationship by having the ability to reverse engineer the private key back from the public key.

In one of the most well-known examples, in 1994 Peter Shor showed that theoretically a quantum computer (if someone can ever successfully build one) would be able to factor large number in polynomial time. Therefore, it would possibly break the public/private key mechanism. Shor’s Algorithm is designed to run on a quantum computer. Basically, Shor’s Algorithm is a process of period-finding, which is done by the Quantum Fourier Transform (QFT), which takes some function f(x) and figures out the period of the function. QFT can be done efficiently on a quantum computer because it can have all the experiments running at once in superposition, with bad experiments deteriorating from destructive interference effects and the good experiments dominating from constructive interference effects. The rest of Shor’s Algorithm is entirely a classical algorithm. Once we have the period-finding mechanism of the QFT, we can exploit it to find patterns in the mathematical structure of the number we are trying to factor.

In recent years, advancement in science has allowed the development of quantum computers. There are many quantum computer vendors such as, but not limited to, IBM, Google, Honeywell, DWave, etc. For examples, in December 2023, IBM had broken the 1000 qubits barrier by releasing their 1121 qubit version. In December 2024, Google had announced their 105 qubits version with effective error correction. Although it may still be years or decades before they become commodity items, some levels of quantum computers have already been available via the cloud today.

Today, post-quantum cryptography algorithms are well-known. Several post-quantum cryptography algorithms have been standardized by NIST and are available to the public. However, these PQC standards are not CPC. Therefore, they can only be applied to making the communication session over the Internet being quantum-safe (QS) and cannot be applied for the secure AI operation. All of these PQC algorithms, or their equivalents, are suitable for these similar purposes.

The QS concern today is addressed in the world of post-quantum cryptography (PQC) studies. As mentioned earlier in this disclosure, there are PQC algorithms recommended by NIST such as, but not limited to, Crystal-Kyber (NIST FIPS-203). However, PQC algorithms have limitations such as the size of the keypairs and the size of the signatures being much larger than the size of the traditional quantum-vulnerable algorithms such as RSA/ECC. In addition, they are also not being built into the handshaking protocol of all web servers and browsers. Hence, we will need to implement proprietary apps to communicate with our server in order to force the use of PQC in the session handshaking protocol.

Similar to PQC, CPC also has its limitation. One of the most notable limitations is the speed of computation. While the preservation of computation is great, the speed of computation as compared to the same computation on unencrypted numbers are significantly slower. As of the date of this disclosure, this limits to special purpose AI model rather than large language model (LLM). In other words, CPC application to LLM requires adjustment which is outside the scope of this disclosure.

Example Solutions

The usage of CPC and PQC can revolutionize the security and privacy aspect of AI operations. They may serve as securing the communication between AI model and AI Users not only today but extending into the post-quantum world of computing when quantum computers become a more common computation machine. They may also serve as securing the user data which can be highly confidential (e.g., credit card transactions, healthcare records, etc.) as well as protecting intellectual property of the AI models.

FIG. 1 illustrates an example architecture illustrating how a general AI operation can be secured by using CPC technology on both the data being fed into the AI model as well as the AI model itself. In the example illustrated in FIG. 1, user data that assumes to be highly confidential will be encrypted using the CPC public key of the user. Similarly, the AI model is also encrypted using the CPC public key of the user. Since CPC is a type of computational preserving encryption, the AI inference process will be successful as long as the AI model and the user data are both encrypted using the same CPC public key. The AI prediction result will also be inherently encrypted and can only be decrypted using the CPC private key that is associated with the CPC public key used for the CPC encryption process.

In FIG. 1, at the endpoint, is the raw Unencrypted User Data 101. The Unencrypted User Data 101 is assumed to be highly confidential such as financial data, healthcare data, etc. The Unencrypted User Data 101 is then encrypted using a CPC Public Key 102 in a CPC encryption process producing the CPC encrypted user data 103.

At another endpoint, there is an Unencrypted AI model 105 who does not want to disclose the efforts spent to train the AI model. The Unencrypted AI model 105 will be encrypted using the same CPC Public Key 102 producing a CPC Encrypted AI model 104. Since both CPC encrypted user data 103 and CPC Encrypted AI model 104 are encrypted using the same CPC Public Key 102, computation on the encrypted cipher/data is preserved between them. In other words, the CPC Encrypted AI model 104 can only process CPC encrypted user data 103 that is encrypted using the same CPC Public Key 102. AI inference will fail on all other user data that are encrypted using a different CPC public key or even unencrypted raw user data.

From this notion, the CPC encrypted user data 103 will be fed into the CPC Encrypted AI model 104 for an AI inference producing a CPC Encrypted AI Prediction Result 106. It is important to note that the CPC Encrypted AI Prediction Result 106 is meaningless without a successful decryption. Finally, the CPC Encrypted AI Prediction Result 106 will be decrypted using the CPC Private Key 107 associated with the CPC Public Key 102 that was used to encrypt the raw Unencrypted User Data 101 and the Unencrypted AI model 105. The decryption process will produce the Decrypted Prediction Result 108.

Advantages of the method illustrated in FIG. 1 may be understood when considered in contrast to the general unencrypted AI operations. For example, when someone is feeding user data into an AI model such as asking ChatGPT a question, the user data is unencrypted and will therefore be fully exposed. Similarly, the ChatGPT model is unencrypted and fully exposed to others who wish to copy their knowledge. The privacy problem is not too serious for the generative AI large language model (LLM) because open knowledges are meant to be opened. However, it problem becomes a huge issue when applying to special purpose AI models whereby the knowledge gained by the special purpose AI models are extremely valuable to certain industries. Typical examples are the credit card fraud detection AI model for financial related industries and the medical advice AI model for the healthcare industry, etc.

Using credit card fraud detection as an example, the credit card companies will welcome an AI model that can accurately analyze and determine if a pending transaction is valid or fraud. However, the credit card companies will be very reluctant to submit any transaction data into the fraud detection AI model because the transaction data contains highly confidential customer information such as credit number, expiry date, security code, transaction amount, merchant, etc. Similarly, the credit card fraud detection AI model vendor is normally reluctant to let the credit card company access its unencrypted AI model of which lots of resources have been spent on its creation and to risk exposing its intellectual property. Applying the example in FIG. 1, both the confidential user data and the AI model are fully protected without disclosing to each other. More detailed description of the operation and examples will be described in FIG. 3 and FIG. 4, respectively.

Figure 2:
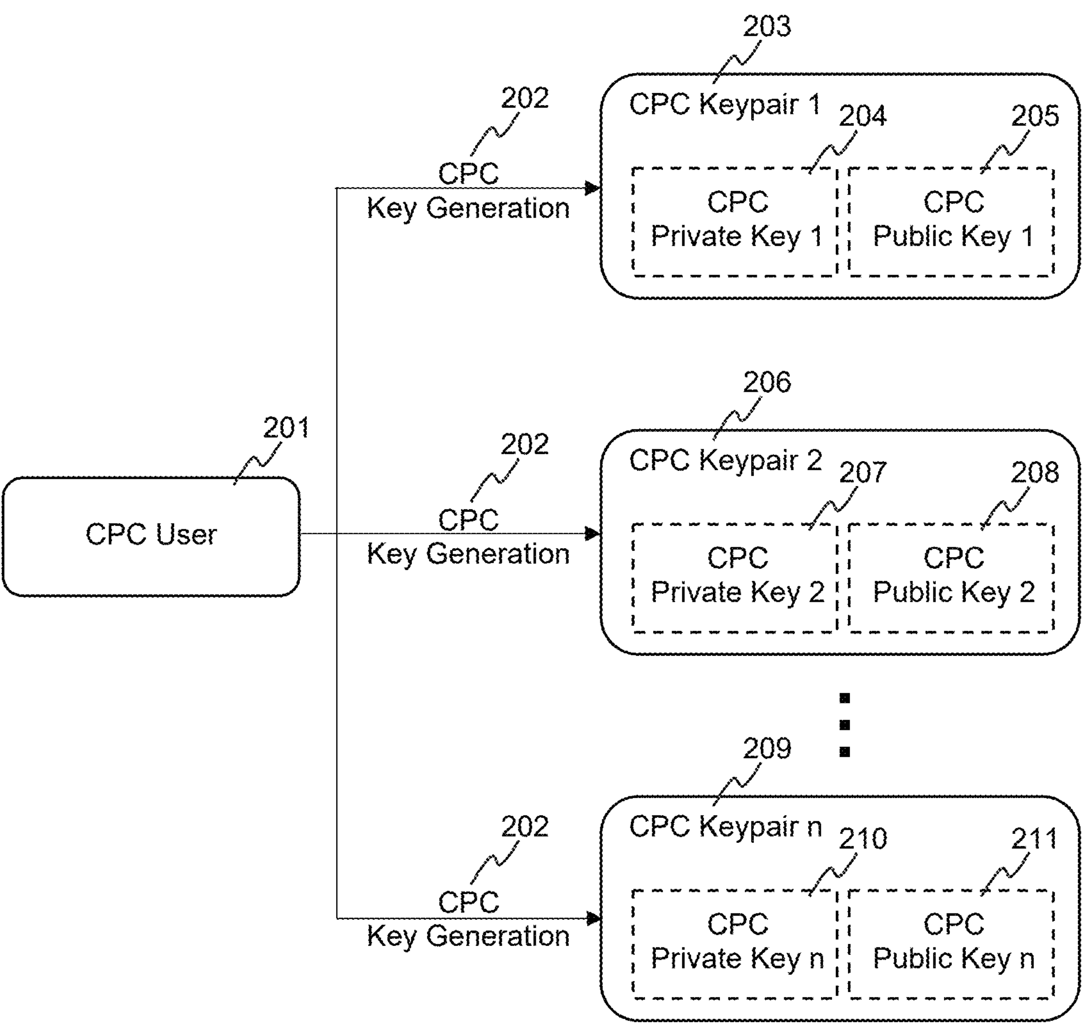
FIG. 2 is a block diagram illustrating how a CPC keypair can be generated.

Referring to FIG. 2, CPC is a type of asymmetric encryption. Asymmetric encryption is also known as public-key encryption whereby it uses a pair of keys to secure data-a public key for encryption and a private key for decryption. The public key is to be shared with others who want to encrypt something for the owner of the private key while the private key must be kept secret by the owner for decryption.

More precisely CPC is a type of asymmetric encryption whereby the encrypted data can be computed as if they are unencrypted. Using a simple example of 1+2=3 for illustration. In non-CPC encryption, the encrypted data of 1 and 2 becomes some "meaningless gibberish" we call "e1" and "e2". Computing "e1"+"e2" will not give the correct answer of 3. However, CPC encrypted data can be computed in a way that "cpc1"+"cpc2" will give the correct answer as long as "cpc1" and "cpc2" are encrypted using the same CPC public key. It is important to note that while it gives the correctly computed answer, the computed answer "cpc3" is also encrypted which looks like gibberish without a successful decryption. In other words, when "cpc3" is successfully decrypted using the CPC private key that is associated with the CPC public key used to encrypt "1" and "2" into "cpc1" and "cpc2" respectively, the decrypted data will be 3.

FIG. 2 illustrates how a CPC keypair can be generated. There is no limit as to how many keypairs one can create. In this example, a CPC user 201 can invoke a CPC key generation process 202 to create as many CPC keypairs as needed such as CPC keypair-1 203, CPC keypair-2 206, and CPC keypair-n 209. As indicated earlier, CPC is a type of asymmetric encryption whereby each of the CPC keypair created will contain 2 keys: a public key and a private key. These keypairs are all different from each other. As illustrated in FIG. 2, keypair-1 203 contains private key-1 204 and public key-1 205. Keypair-2 206 contains private key-2 207 and public key-2 208. Keypair-2 209 contains private key-n 210 and public key-n 211, and so on. The user typically distributes the public key to whoever want to encrypt something for him/her while only by using the associated private key can successfully decrypt the encrypted data. For further clarification, using private key-2 can only decrypt data encrypted using public key-2 and will fail on data encrypted using all other public keys.

In this disclosure, the secure AI operation utilizes the nature of CPC asymmetric encryption architecture to achieve secure computation. Although there is no limit on the number of CPC keypair one can create, our examples are assuming the use of the same keypair for the purpose of an easy illustration and does not imply any limitation whatsoever.

It is important to note that in CPC the public key of a keypair is indeed a logical key that is a combination of multiple "subkeys." Sharing or distributing the public key really mean the whole logical group of "subkeys" to be shared or distributed.

Figure 3:
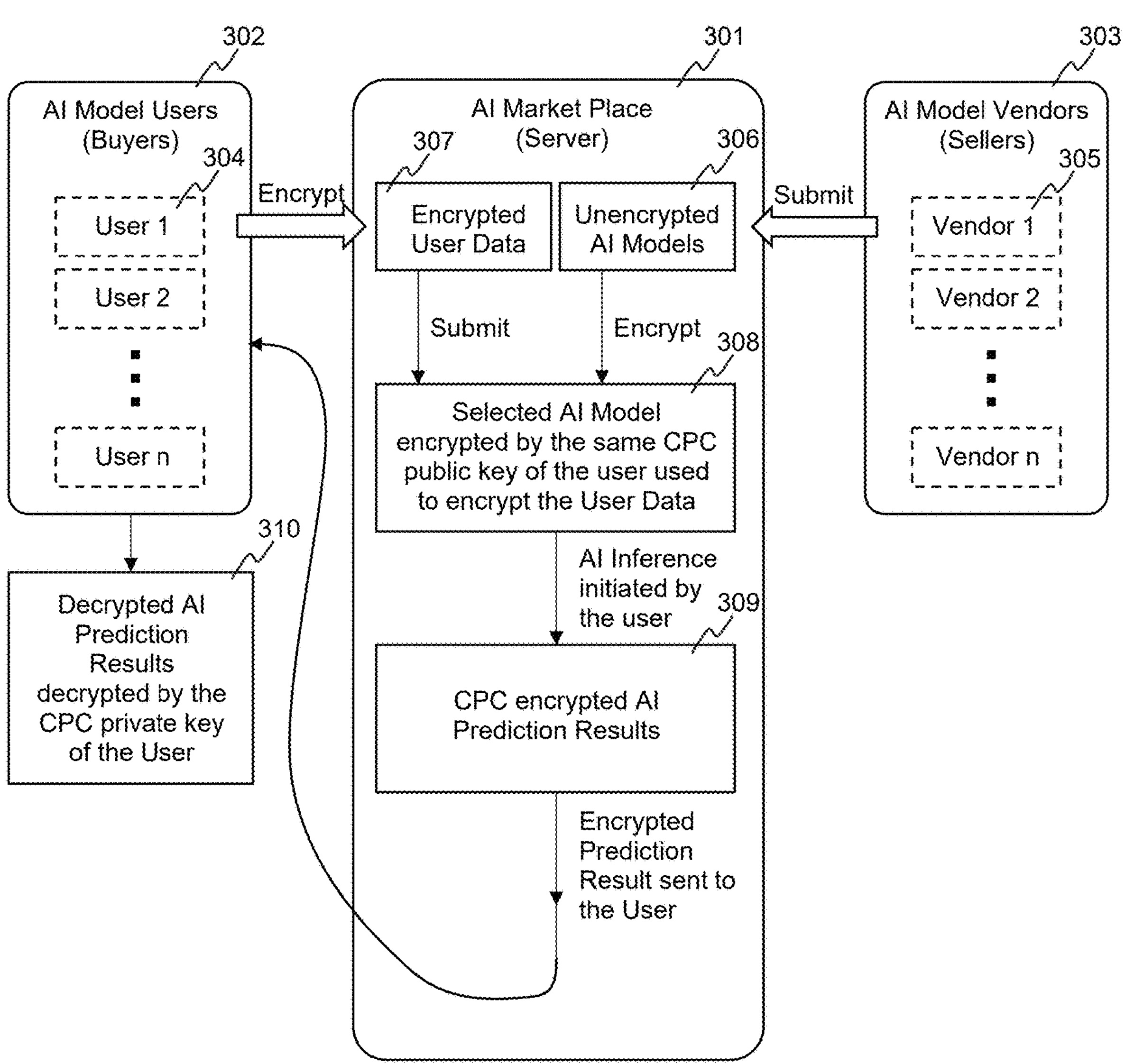
FIG. 3 is a block diagram of an example of how a CPC AI operation platform is bridging the AI model users and the AI model vendors.

FIG. 3 is a block diagram of an end-to-end block diagram example illustrating a CPC AI operation platform providing a bridge between AI model users and AI model vendors in a secure fashion. In this example, the AI marketplace server 301 has a central network of one or more servers facilitating communications between the AI model users 302 (the buyers) and the AI model vendor 303 (the sellers). Practically, there are multiple AI model users 302 such as User-1 304. Similarly, there are multiple AI model vendors 303 such as Vendor-1 305.

AI model vendor-1 305 or other AI model vendors are equipped to submit unencrypted AI model(s) 306 to the AI marketplace server 301, which allows AI model user-1 304 or other users to search for an AI model they want to use. Once AI model user-1 304 has selected an AI model to use, a CPC keypair illustrated in FIG. 2 will be generated by AI model user-1 304 catered to the selected AI model. The CPC private key is for AI model user-1 304 to keep and never to be disclosed to any third party while the CPC public key is to be publicly distributed to any third party who wants to encrypt something for AI model user-1 304 whereby only AI model user-1 304 possessing the CPC private key can decrypt the data encrypted using the CPC public key of Ai Model User-1 304. For example, the CPC public key can be kept in a public database called key exchange server (KES) for others to access or it can be kept in the Server of the AI Market Place 301. There are many ways to share the CPC public key which is not important in the context of this disclosure and the above example should not limit the scope of this disclosure.

AI model user-1 304 will create a CPC encrypted user data 307 by using its CPC public key of the AI model user-1 304 to encrypt its confidential user data. AI marketplace server 301 will also create a CPC Encrypted AI model 308 using the same CPC public key used by AI model user-1 304 to CPC encrypt the confidential user data of the AI model user-1 304. This CPC encryption operation creates a CPC Encrypted AI model 308 that is only computationally compatible with the CPC encrypted user data 307 because they are both CPC encrypted using the same CPC public key of AI model user-1 304.

In response to AI model user-1 304 to perform an AI inference operation, the AI marketplace server 301 performs an AI inference operation by submitting the CPC encrypted user data 307 to the CPC Encrypted AI model 308. The AI inference operation will then generate the CPC Encrypted AI Prediction Results 309. The CPC Encrypted AI Prediction Results 309 are finally returning back to AI model user-1 304. Only the CPC private key possessed by the AI model user-1 304 can be used to decrypt the CPC Encrypted AI Prediction Results 309 to produce the Decrypted AI Prediction Results 310.

This example of AI operations ensures that confidential user data of AI model user-1 (304) is not exposed to any party including the AI model vendor 305 or even the AI marketplace server 301. On the other hand, the Unencrypted AI models 306 provided by the AI model vendor 305 are also not exposing to AI Model user-1 304. In other words, everything is end-to-end secured from AI model user-1 304 to the AI inference operation and back to AI model user-1 304 without any decryption at any point along the process.

Figure 4:
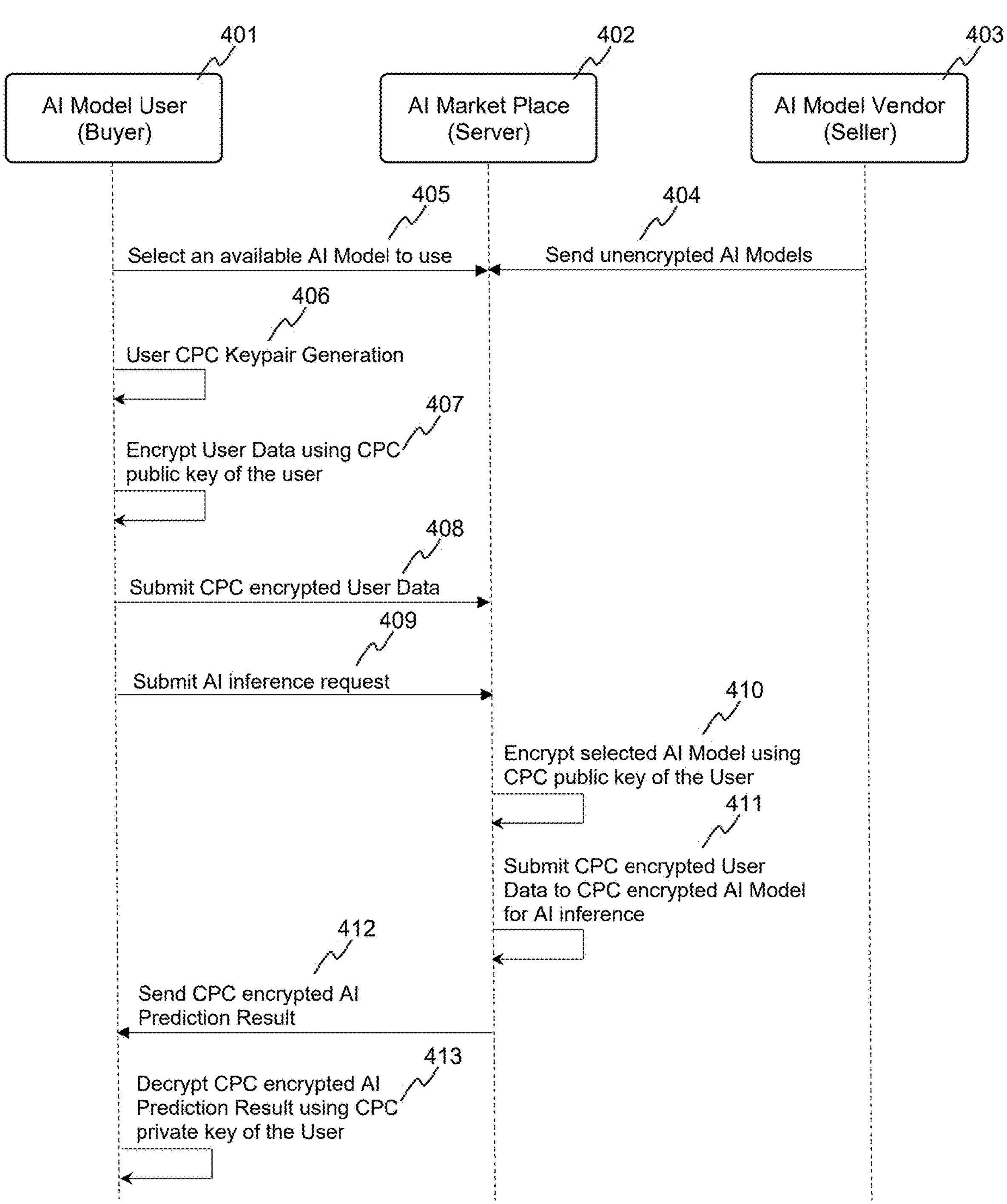
FIG. 4 is a call flow diagram of an example of how a CPC AI operation platform is bridging the AI model users and the AI model vendors.

FIG. 4 is a call flow diagram of a complete end-to-end example illustrating how a CPC AI operation platform is bridging between the users and the AI model vendors in a secure privacy-preserving fashion. Independently AI model vendor 403 will submit an unencrypted AI model to the AI marketplace server (402). At one point, an AI model user 401 selects an AI model to use 405 and informs AI marketplace server 402 about that. The AI model user 401 will create a CPC cryptographic keypair catered for the selected AI model by invoking a User CPC Keypair Generation 406 process. There are many ways a User CPC Keypair Generation 406 operation can be provided to an AI model user 401 such as, but not limited to, a local application, an online tool, etc. As illustrated in FIG. 2, a CPC keypair contains a CPC private key and a CPC public key. The CPC private key is for an AI model user 401 to keep and never to be disclosed to any third party while the CPC public key is to be publicly distributed to any third party who wants to encrypt something for AI model user 401 whereby only the AI model user 401 who possesses the CPC private key can decrypt the data encrypted using the CPC public key of AI model user 401. For example, the CPC public key can be kept in a public database called key exchange server (KES) for others to access or it can be kept in the AI marketplace server 402. There are many ways to share the CPC public key which is not important in the context of this disclosure and the above example should not limit the scope of this disclosure.

The AI model user 401 will perform a CPC encryption of the confidential user data 407 using CPC public key created in 406 by the AI model user 401. The CPC encrypted user data will be submitted 408 to the AI marketplace server 402.

After receiving an AI inference request 409 from the AI model user 401, the AI marketplace server 402 will CPC encrypt the selected AI model 410. This CPC encryption process is performed using the same CPC public key used by the AI model user 401 to CPC encrypt the confidential user data in 407. Using the same CPC public key in the CPC encryption process ensures the CPC encrypted AI model and the CPC encrypted user data are computationally compatible with each other so that the AI marketplace server 402 can submit the CPC encrypted user data to the CPC encrypted AI model to perform a CPC encrypted AI inference process.

After a successful AI inference process, the AI marketplace server 402 will generate the AI prediction results. It is important to note that since the AI inference process has been performed between the user data and AI model that are both CPC encrypted using the same CPC public key, the AI prediction results are also CPC encrypted. The AI marketplace server 402 will send the CPC encrypted AI prediction results 412 back to the AI model user 401. Since the AI prediction results are CPC encrypted using the CPC public key of the AI model user 401, it can only be read by the AI model user 401 after a successful CPC decryption 413 by using the CPC private key of the AI model user 401.

Figure 5:
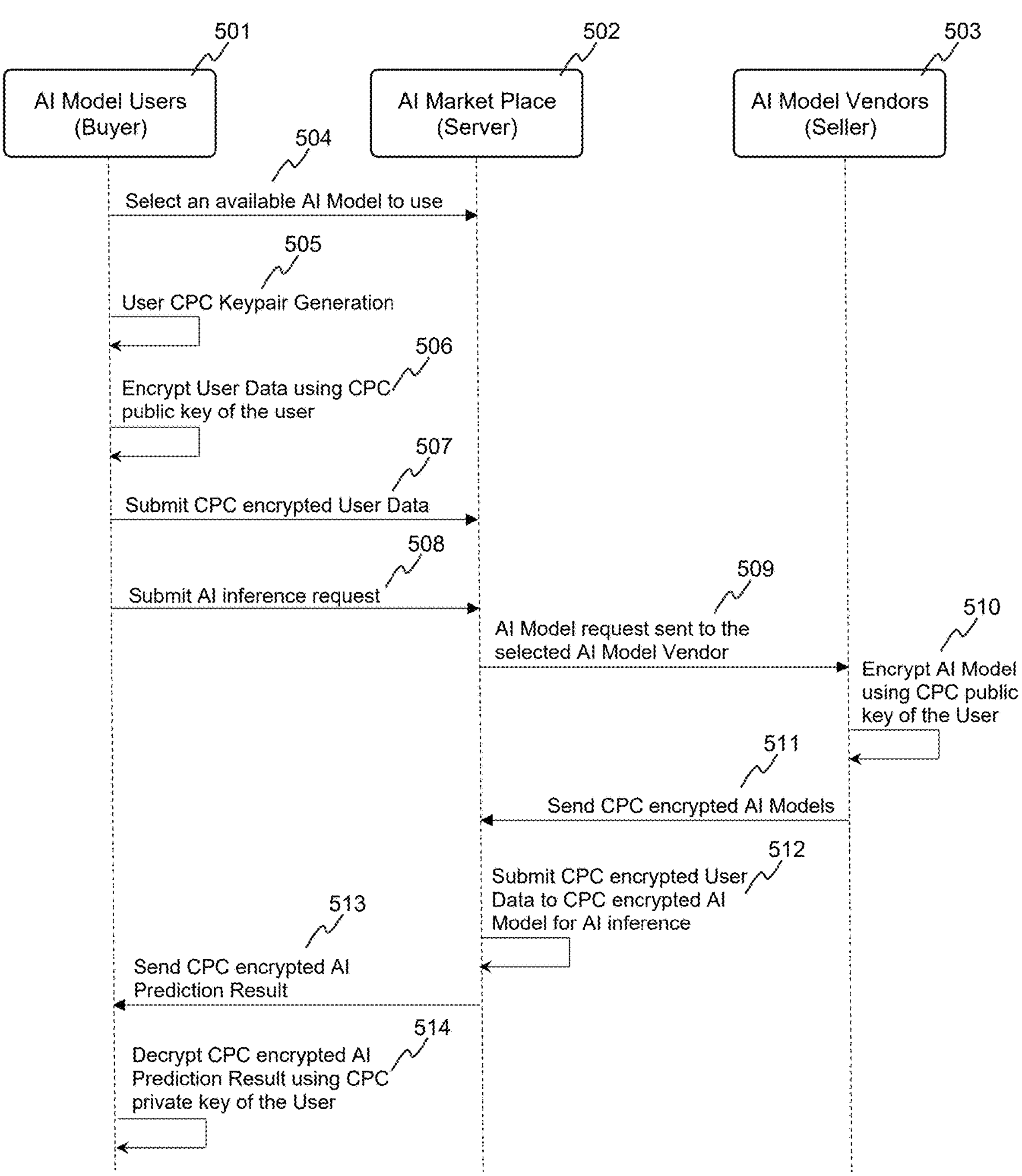
FIG. 5 is a call flow diagram of another example of how a CPC AI operation platform is bridging the AI model users and the AI model vendors.

FIG. 5 is a call flow of another complete end-to-end example illustrating how a CPC AI operation platform is bridging between the users and the AI model vendors in a secure fashion. This is similar to FIG. 4 but different in a way that the unencrypted AI model from the AI model vendor 503 has never been submitted to the AI marketplace server 502. This is a slightly more secured way of implementation because even the AI marketplace server 502 has no access to the unencrypted AI model of the AI model vendors 503 at any point in the AI operation process.

In other words, in this example AI model vendor 503 never shares an unencrypted AI model with the AI marketplace server 502. At one point, an AI model user 501 selects an AI model to use 504 and informs AI marketplace server 502 about that. The AI model user 501 then creates a CPC cryptographic keypair by invoking a User CPC Keypair Generation 505 process. There are many ways the User CPC Keypair Generation 505 operation can be provided to an AI model user 501 such as, but not limited to, a local application, an online tool, etc. As described in FIG. 2, a CPC keypair contains a CPC private key and a CPC public key. The CPC private key is for an AI model user 501 to keep and never to be disclosed to any third party while the CPC public key is to be publicly distributed to any third party who wants to encrypt something for AI model user 501 whereby only AI model user 501 who possesses the CPC private key can decrypt the data encrypted using the CPC public key of AI model user 501. For example, the CPC public key can be kept in a public database called key exchange server (KES) for others to access or it can be kept in the AI marketplace server 502. There are many ways to share the CPC public key which is not important in the context of this disclosure and the above example should not limit the scope of this disclosure.

The AI model user 501 will CPC encrypt the confidential user data 506. The CPC encryption process will be performed using the CPC public key of the AI model user 501 created in 505 and the CPC encrypted user data will be submitted 507 to the AI marketplace server 502.

After receiving an AI inference request 508 from the AI model user 501, the AI marketplace server 502 will send an AI model request 509 to the AI model vendor 503 who owns the selected AI model in order to obtain the CPC encrypted version of the selected AI model. The AI model vendor 503 performs a CPC encryption 510 of the select unencrypted AI model using the same CPC public key of the AI model user 501 used to CPC encrypt the user data in 506. The CPC encrypted AI model will be sent 511 to the AI marketplace server 502. At this point, the AI marketplace server 502 has both the CPC encrypted user data as well as the CPC encrypted AI model that are computationally compatible with each other so that the AI marketplace server 502 can submit the CPC encrypted user data to the CPC encrypted AI model to perform an encrypted AI inference process 512.

After a successful AI inference process, the AI marketplace server 502 will generate the AI prediction results. It is important to note that since the AI inference process has been performed between the user data and AI model that are both CPC encrypted using the same CPC public key, the AI prediction results are also CPC encrypted. The AI marketplace server 502 will send the CPC encrypted AI prediction results 513 back to the AI model user 501. Since the AI prediction results are CPC encrypted using the CPC public key of the AI model user 501, it can only be read by the AI model user 501 after a successful CPC decryption 514 by using the CPC private key of the AI model user 501.

This example is more secured because neither the confidential user data of AI model user 501 nor the AI model of the AI model vendor 503 has been exposed to either part, not even the AI marketplace server 502. Hence, a higher level of end-to-end security is ensured.

Figure 6:
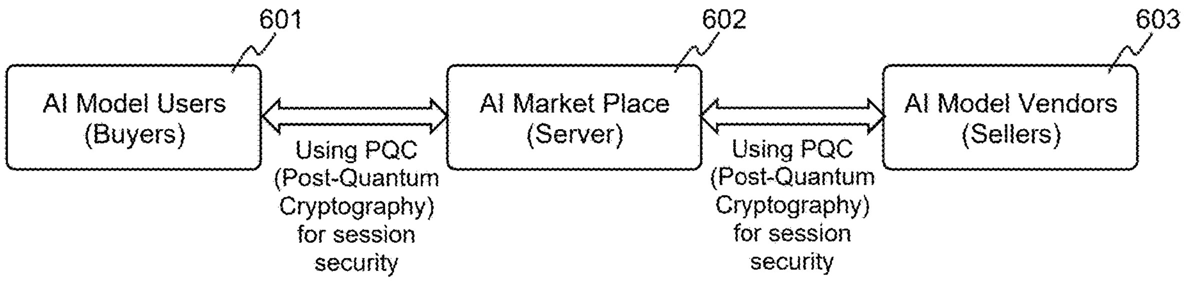
FIG. 6 is a block diagram of an example of how a CPC AI operation platform is bridging the users and the AI model vendors in a manner that is safe in the post-quantum world of computing.

FIG. 6 is a block diagram of an example of how a CPC AI operation platform is bridging the users and AI model vendors in a manner that is safe in the post-quantum world of computing. In FIG. 3, the communication between AI model users 302 and the AI marketplace server 301 is assumed to be traditional Internet connection as of the date of this disclosure. In other words, it is standard https connection protocol (e.g., TLS 1.x using RSA key encapsulation method) which is vulnerable to the power of quantum computers in the post-quantum world of computing. Similar assumption applies to the communication between the AI model vendors 303 and the AI marketplace server 301.

In this example, we will use Post-Quantum Cryptography (PQC) as the key encapsulation method whereby the asymmetric cryptography used to encapsulate the session key (e.g., AES key) is going to be safe against the power of quantum computers in the post-quantum world of computing. In other words, the private key of the encapsulation algorithm cannot be reverse-engineered back to the private key even using the excessive computing power of quantum computers to perform the brute-forcing. Being quantum-safe for the session key encapsulation ensures the end-to-end integrity of the communication so that even a powerful malicious user managed to eavesdrop the communication session will not be able to decode the communication data and engineering back the sensitive user data of the AI model users. From this token, the knowledge of the AI models that the AI model vendors have s invested heavily to create can also be preserved.

It will be appreciated that many variations of the processes described are possible, including alterations in which entities include which data in which part of the AI operation.

For example, there are many different ways for the CPC public key of the AI model users to be kept such as, but not limited to, maintaining on a public key exchange (KES) server. Alternatively, AI model users can each manage their own public CPC key, with AI model users sending the public key to the AI marketplace server or sending it directly to the AI model vendors for CPC encryption.

We claim:

1. A system comprising a computer server configured to:

solicit, from a plurality of model vendors, descriptions artificial intelligence (AI) models provided by the model vendors;

receive, from two or more of the model vendors, descriptions of available AI models;

provide, to one or more model users, the descriptions of the available AI models;

receive, from a model user over a first post-quantum cryptographically (PQC) secure session, a request and user data, wherein:

the request is a request for a prediction to be generated by a selected AI model, the selected AI model is selected by the model user from the available AI models, the user data is encrypted using a computation-preserving-cryptography (CPC) public key of the model user, and the CPC public key is associated with a CPC private key of the model user;

responsive to receiving the request, obtain the CPC public key of the model user from a key exchange server (KES);

obtain, over a second PQC secure session from a selected model vendor providing the selected AI model, an encrypted version of the selected AI model, wherein the encrypted version of the selected AI model is encrypted, using the CPC public key of the model user, by the selected model vendor by the selected AI model;

generate, using the encrypted version of the selected AI model on the encrypted user data, the prediction, such that the prediction is inherently encrypted using the public CPC key of the model user; and provide, to the model user, the encrypted prediction.

2. The system of claim 1, wherein the computer server is further configured to operate as the KES that stores the public CPC key of the model user.

3. The system of claim 1, wherein the computer server is further configured to generate the prediction by:

sending the encrypted user data and the encrypted version of the selected AI model to an AI model execution server; and receiving the prediction from the AI model execution server.

4. The system of claim 3, wherein the computer server is further configured to select the AI model execution server by using a staking mechanism.

5. A system comprising a computer server configured to:

solicit, from a plurality of model vendors, descriptions artificial intelligence (AI) models provided by the model vendors;

receive, from two or more of the model vendors, descriptions of available AI models;

provide, to one or more model users, the descriptions of the available AI models;

receive, from a model user over a first post-quantum cryptographically (PQC) secure session, a request and user data, wherein:

the request is a request for a prediction to be generated by a selected AI model, the selected AI model is selected by the model user from the available AI models, the user data is encrypted using a computation-preserving-cryptography (CPC) public key of the model user, and the CPC public key is associated with a CPC private key of the model user;

responsive to receiving the request, obtain the CPC public key of the model user from a key exchange server (KES);

obtain, over a second PQC secure session from a selected model vendor providing the selected AI model, an unencrypted version of the selected AI model;

encrypt, using the CPC public key of the model user, the unencrypted version of the selected AI model to create an encrypted version of the selected AI model;

generate, using the encrypted version of the selected AI model on the encrypted user data, the prediction, such that the prediction is inherently encrypted using the public CPC key of the model user; and provide, to the model user, the encrypted prediction.

6. The system of claim 5, wherein the computer server is further configured to operate as the KES that stores the public CPC key of the model user.

7. The system of claim 1, wherein the computer server is further configured to generate the prediction by:

sending the encrypted user data and the encrypted version of the selected AI model to an AI model execution server; and receiving the prediction from the AI model execution server.

8. The system of claim 7, wherein the computer server is further configured to select the AI model execution server by using a staking mechanism.

* * * * *